US010221282B2

(12) United States Patent
Iwaya et al.

(10) Patent No.: US 10,221,282 B2
(45) Date of Patent: Mar. 5, 2019

(54) RESIN COMPOSITION, ADHESIVE AGENT, AND SEALING AGENT

(71) Applicant: NAMICS CORPORATION, Niigata (JP)

(72) Inventors: Kazuki Iwaya, Niigata (JP); Fuminori Arai, Niigata (JP)

(73) Assignee: NAMICS CORPORATION, Niigata (JP)

( * ) Notice: Subject to any disclaimer, the term of this patent is extended or adjusted under 35 U.S.C. 154(b) by 6 days.

(21) Appl. No.: 15/556,955

(22) PCT Filed: Mar. 8, 2016

(86) PCT No.: PCT/JP2016/057106
§ 371 (c)(1),
(2) Date: Sep. 8, 2017

(87) PCT Pub. No.: WO2016/143777
PCT Pub. Date: Sep. 15, 2016

(65) Prior Publication Data
US 2018/0044478 A1    Feb. 15, 2018

(30) Foreign Application Priority Data
Mar. 12, 2015    (JP) .................... 2015-048910

(51) Int. Cl.
C08G 75/045    (2016.01)
C08G 75/0222   (2016.01)
C08G 75/04     (2016.01)
C09J 11/06     (2006.01)
C09J 133/00    (2006.01)
C09J 163/08    (2006.01)
C08L 63/08     (2006.01)
C09J 181/02    (2006.01)
C09J 133/06    (2006.01)
C09J 133/08    (2006.01)

(52) U.S. Cl.
CPC ....... C08G 75/045 (2013.01); C08G 75/0222 (2013.01); C08G 75/04 (2013.01); C08L 63/08 (2013.01); C09J 11/06 (2013.01); C09J 133/00 (2013.01); C09J 133/06 (2013.01); C09J 133/08 (2013.01); C09J 163/08 (2013.01); C09J 181/02 (2013.01)

(58) Field of Classification Search
USPC ................................................. 528/363, 389
See application file for complete search history.

(56) References Cited

U.S. PATENT DOCUMENTS

| 5,430,112 A | 7/1995 | Takeuchi |
| 6,653,371 B1 | 11/2003 | Woolfson |
| 2007/0021582 A1 | 1/2007 | Koto |
| 2007/0096056 A1 | 5/2007 | Itou |
| 2010/0022745 A1 | 1/2010 | Nagata |
| 2017/0073459 A1 | 3/2017 | Arai |

FOREIGN PATENT DOCUMENTS

| JP | 60108430 A2 | 6/1985 |
| JP | 06211969 | 8/1994 |
| JP | 06211970 | 8/1994 |
| JP | 2008184514 A2 | 8/2008 |
| JP | 2009051954 A2 | 3/2009 |
| JP | 4394281 B2 | 1/2010 |
| JP | 2010117545 A2 | 5/2010 |
| JP | 2011026539 A2 | 2/2011 |
| JP | 4976575 B1 | 7/2012 |
| JP | 2015059099 A2 | 3/2015 |
| WO | 2005052021 A1 | 6/2005 |
| WO | 2005070991 A1 | 8/2005 |
| WO | 2013005471 A1 | 1/2013 |
| WO | 2013137087 A1 | 9/2013 |
| WO | 2015141347 A1 | 9/2015 |
| WO | 2016027716 A1 | 2/2016 |

OTHER PUBLICATIONS

International Search Report dated Jun. 7, 2016 filed in PCT/JP2016/057106.

Primary Examiner — Terressa Boykin
(74) Attorney, Agent, or Firm — Rankin, Hill & Clark LLP

(57) ABSTRACT

There is provided a photocurable and thermosetting resin composition which suppresses decrease of adhesive strength in a moisture resistance test of the cured resin composition, and has a sufficiently long pot life. The resin composition includes (A) an acrylic resin, (B) a multifunctional nitrogen-containing heterocyclic compound represented by a specific chemical formula, (C) a latent curing agent, (D) a radical polymerization inhibitor, and (E) an anionic polymerization retarder. The resin composition preferably further includes (F) a compound having a glycidyl group, other than the acrylic resin.

18 Claims, No Drawings

RESIN COMPOSITION, ADHESIVE AGENT, AND SEALING AGENT

TECHNICAL FIELD

The present invention relates to a resin composition which is cured by light and heat. More particularly, the present invention relates to a photocurable and thermosetting resin composition which can be temporarily fixed by light irradiation and permanently cured by heating.

BACKGROUND ART

An adhesive agent which is temporarily fixed by ultraviolet (UV) irradiation and permanently cured by heat is used in many areas (for example, Patent Literatures 1 and 2). Particularly, such an adhesive agent is often used in uses of an image sensor module. When the temperature increases in the manufacturing process of an image sensor, a lens or the like used in the image sensor deteriorates. Therefore, an adhesive agent and a sealing material used in the manufacture of an image sensor are required to have low-temperature curing properties. Furthermore, in terms of production costs, short-time curing properties are also required. An example of such an adhesive agent having low-temperature and short-time curing properties may include a thiol adhesive agent (for example, Patent Literatures 3 and 4). However, it is extraordinarily difficult to provide UV curing properties to the thiol adhesive agent. This is because a curing reaction between an acrylic resin having UV curing properties and a thiol resin is more likely to proceed than a curing reaction between resin (for example, an epoxy resin), other than the acrylic resin, and the thiol resin, causing a pot life to be shortened to a level that the thiol adhesive agent cannot be practically used.

In view of the above-described problems, the present inventors developed a resin composition which includes (A) an acrylic resin, (B) a thiol compound, (C) a latent curing agent, (D) a radical polymerization inhibitor, and (E) an anionic polymerization retarder (Patent Literature 5), for the purpose of providing a photocurable and thermosetting resin composition having a sufficiently long pot life.

CITATION LIST

Patent Literature

Patent Literature 1: JP-A-2009-51954
Patent Literature 2: WO 2005/052021
Patent Literature 3: JP-A-6-211969
Patent Literature 4: JP-A-6-211970
Patent Literature 5: Japanese Patent No. 4976575

SUMMARY OF THE INVENTION

Problems to be Solved by the Invention

However, it was found that the resin composition including (A) an acrylic resin, (B) a thiol compound, (C) a latent curing agent, (D) a radical polymerization inhibitor, and (E) an anionic polymerization retarder has a problem that the adhesive strength decreases in a moisture resistance test such as a pressure cooker test (a reliability test including maintaining the cured resin composition at a temperature of 121° C., an atmospheric pressure of 2 atm, and a relative humidity of 100%), and this resin composition sometimes cannot be used in uses with high reliability.

The present invention has been achieved in view of the above-described problems. That is, an object of the present invention is to provide a photocurable and thermosetting resin composition which suppresses the decrease of adhesive strength in a moisture resistance test of the cured resin composition, and has a sufficiently long pot life.

Solution to the Problems

The present inventors intensively conducted studies in order to solve the above-described problems. As a result, the below-described photocurable and thermosetting resin composition was obtained by adding an acrylic resin, a specific multifunctional nitrogen-containing heterocyclic compound, a latent curing agent, a radical polymerization inhibitor, and an anionic polymerization retarder. That is, the decrease of adhesive strength of this resin composition is suppressed in a moisture resistance test. Furthermore, this resin composition has a sufficiently long pot life to a level that it can endure an actual use.

The present invention relates to a resin composition, an adhesive agent, and a sealing agent, which solve the above-described problems by having the following structures.

[1] A resin composition including:
(A) an acrylic resin;
(B) a multifunctional nitrogen-containing heterocyclic compound represented by chemical formula (1) or chemical formula (2)

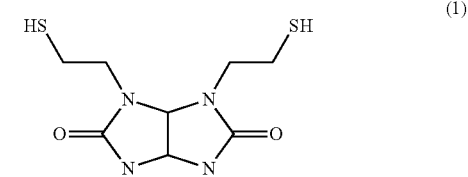

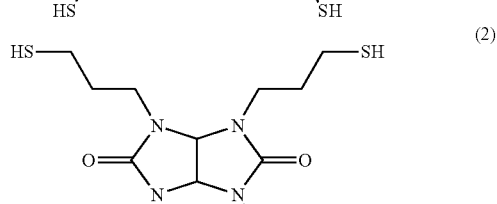

(C) a latent curing agent;
(D) a radical polymerization inhibitor; and
(E) an anionic polymerization retarder.
[2] The resin composition according to the above-described [1] further including (F) a compound having a glycidyl group, other than the acrylic resin.
[3] The resin composition according to the above-described [2], in which the (F) component is a vinyl compound having at least one glycidyl group.
[4] The resin composition according to the above-described [2], in which the (F) component is polybutadiene having at least one glycidyl group.
[5] The resin composition according to any one of the above-described [1] to [4], in which [thiol equivalent of (B) component]/[acryl equivalent of (A) component] is 0.5 to 2.0.

[6] The resin composition according to any one of the above-described [1] to [5], in which the content of the (D) component is 0.0001 to 1.0 part by mass with respect to 100 parts by mass of the resin composition.

[7] The resin composition according to any one of the above-described [1] to [6], in which the content of the (E) component is 0.001 to 1.0 part by mass with respect to 1 part by mass of the (C) component.

[8] The resin composition according to any one of the above-described [1] to [7], in which the (D) component is at least one selected from the group consisting of N-nitroso-N-phenylhydroxylamine aluminum, triphenylphosphine, p-methoxyphenol, and hydroquinone.

[9] The resin composition according to any one of the above-described [1] to [8], in which the (E) component is at least one selected from the group consisting of boric acid ester, aluminum chelate, and organic acid.

[10] An adhesive agent comprising the resin composition according to any one of the above-described [1] to [9].

[11] A sealing agent comprising the resin composition according to any one of the above-described [1] to [9].

Effects of the Invention

According to [1] of the present invention, a photocurable and thermosetting resin composition can be provided. That is, the decrease of adhesive strength is suppressed in a moisture resistance test of the cured resin composition. Furthermore, this resin composition has a sufficiently long pot life.

According to [10] of the present invention, there can be obtained a highly reliable semiconductor element, such as an image sensor module, which is manufactured with an adhesive agent having an excellent moisture resistance. According to [11] of the present invention, there can be obtained a highly reliable semiconductor element, such as an image sensor module, which includes a component such as a lens sealed with a sealing agent having an excellent moisture resistance.

DESCRIPTION OF THE EMBODIMENTS

The resin composition according to the present invention (hereinafter, referred to as the resin composition) includes
(A) an acrylic resin,
(B) a multifunctional nitrogen-containing heterocyclic compound represented by chemical formula (1) or chemical formula (2)

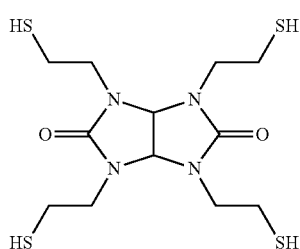

(1)

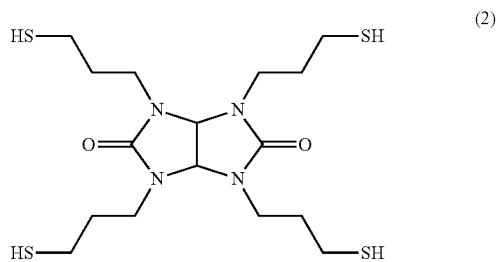

(2)

(C) a latent curing agent,
(D) a radical polymerization inhibitor, and
(E) an anionic polymerization retarder.

The acrylic resin as the (A) component can provide transparency and appropriate hardness to the cured resin composition. This (A) component is an acrylic acid ester monomer and/or a methacrylic acid ester monomer, or an oligomer thereof. Examples of the acrylic acid ester monomer and/or the methacrylic acid ester monomer, or the oligomer thereof which are usable in the present invention may include diacrylate and/or dimethacrylate of tris(2-hydroxyethyl)isocyanurate, tris(2-hydroxyethyl)isocyanurate triacrylate and/or trimethacrylate, trimethylolpropane triacrylate and/or trimethacrylate, or an oligomer thereof, pentaerythritol triacrylate and/or trimethacrylate, or an oligomer thereof, polyacrylate and/or polymethacrylate of dipentaerythritol, tris(acryloxyethyl)isocyanurate, caprolactone-modified tris(acryloxyethyl)isocyanurate, caprolactone-modified tris(methacryloxyethyl)isocyanurate, polyacrylate and/or polymethacrylate of alkyl-modified dipentaerythritol, and polyacrylate and/or polymethacrylate of caprolactone-modified dipentaerythritol. Examples of a commercially available product of the (A) component may include polyester acrylate (product name: EBECRYL810) manufactured by Daicel-Allnex Ltd. and polyester acrylate (product name: M7100) manufactured by Toagosei Co., Ltd. One (A) component may be used alone. Also, two or more (A) components may be used in combination.

The multifunctional nitrogen-containing heterocyclic compound as the (B) component is represented by chemical formula (1):

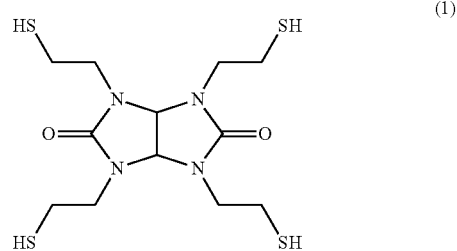 [SMILES: O=C1N(CCS)C2C(N1CCS)N(CCS)C(=O)N2CCS]

(1)

or chemical formula (2):

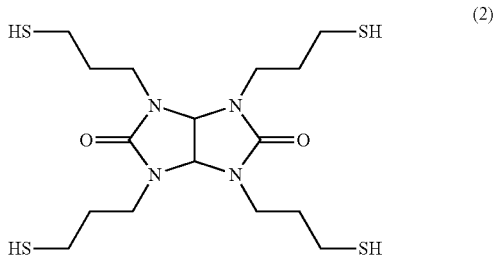 [SMILES: O=C1N(CCCS)C2C(N1CCCS)N(CCCS)C(=O)N2CCCS]

(2)

These compounds have a functional group (—CH$_2$—CH$_2$—SH or —CH$_2$—CH$_2$—CH$_2$—SH) combined with each of four nitrogen atoms of the nitrogen-containing heterocyclic compound. Here, as the thiol compound used in Patent Literature 5 described above, there are used pentaerythritol tetrakis(3-mercaptopropionate), trimethylolpropane tris(3-mercaptopropionate), dipentaerythritol hexakis(3-mercaptopropionate), and pentaerythritol tetrakis(3-mercaptobutyrate). All of these thiol compounds contain an ester bond. This ester bond is likely to be hydrolyzed. It is considered that this causes the moisture resistance to be poor. On the contrary, the (B) component does not contain an ester bond. An example of a commercially available product of the (B) component may include a thiol glycoluril derivative manufactured by Shikoku Chemicals Corporation. One (B) component may be used alone. Also, two or more (B) components may be used in combination.

The latent curing agent as the (C) component is a compound which is in an inactive state at room temperature, and is activated by heating to act as a curing accelerator. Examples of such a latent curing agent may include an imidazole compound which is solid at normal temperature, a solid-dispersed amine adduct latent curing accelerator such as a reaction product of an amine compound and an epoxy compound (amine-epoxy adduct product), and a reaction product of an amine compound and an isocyanate compound or a urea compound (urea-type adduct product).

Examples of the imidazole compound which is solid at normal temperature may include 2-heptadecylimidazole, 2-phenyl-4,5-dihydroxymethylimidazole, 2-undecylimidazole, 2-phenyl-4-methyl-5-hydroxymethylimidazole, 2-phenyl-4-benzyl-5-hydroxymethylimidazole, 2,4-diamino-6-(2-methyl imidazolyl-(1))-ethyl-S-triazine, 2,4-diamino-6-(2'-methyl imidazolyl-(1)')-ethyl-S-triazine.isocyanuric acid adducts, 2-methylimidazole, 2-phenylimidazole, 2-phenyl-4-methylimidazole, 1-cyanoethyl-2-phenylimidazole, 1-cyanoethyl-2-methylimidazole-trimellitate, 1-cyanoethyl-2-phenylimidazole-trimellitate, N-(2-methylimidazolyl-1-ethyl)-urea, and N,N'-(2-methylimidazolyl-(1)-ethyl)-adipoyl diamide. However, the imidazole compound which is solid at normal temperature is not limited to these examples.

Examples of an epoxy compound used as one of raw materials for manufacturing the solid-dispersed amine adduct latent curing accelerator (amine-epoxy adduct curing accelerator) may include polyglycidyl ether obtained by the reaction between polyhydric phenol such as bisphenol A, bisphenol F, catechol, and resorcinol, or polyhydric alcohol such as glycerin and polyethylene glycol, and epichlorohydrin, glycidyl ether ester obtained by the reaction between hydroxycarboxylic acid such as p-hydroxybenzoic acid and β-hydroxynaphthoic acid, and epichlorohydrin, polyglycidyl ester obtained by the reaction between polycarboxylic acid such as phthalic acid and terephthalic acid, and epichlorohydrin, and a glycidyl amine compound obtained by the reaction between 4,4'-diaminodiphenylmethane, m-aminophenol, or the like, and epichlorohydrin. Further examples may include a multifunctional epoxy compound such as an epoxidized phenol novolac resin, an epoxidized cresol novolac resin, and epoxidized polyolefin, and a monofunctional epoxy compound such as butyl glycidyl ether, phenyl glycidyl ether, and glycidyl methacrylate. However, the above-described epoxy compound is not limited to these.

An amine compound used as another raw material for manufacturing the solid-dispersed amine adduct latent curing accelerator may be any compound which has in its molecule one or more active hydrogens which can undergo an addition reaction with an epoxy group, and has in its molecule one or more functional groups selected from a primary amino group, a secondary amino group, and a tertiary amino group. Examples of such an amine compound will be indicated below. However, the above-described amino compound is not limited to these. Examples thereof may include aliphatic amines such as diethylenetriamine, triethylenetetramine, n-propylamine, 2-hydroxyethyl aminopropylamine, cyclohexylamine, and 4,4'-diamino-dicyclohexylmethane, an aromatic amine compound such as 4,4'-diaminodiphenylmethane and 2-methylaniline, and a nitrogen atom-containing heterocyclic compound such as 2-ethyl-4-methylimidazole, 2-ethyl-4-methylimidazoline, 2,4-dimethylimidazoline, piperidine, and piperazine. However, the above-described amino compound is not limited to these.

Among these, the compound having in its molecule a tertiary amino group is particularly a raw material which provides a latent curing accelerator having excellent curing-promoting properties. Examples of such a compound may include primary or secondary amines having in its molecule a tertiary amino group, such as an amine compound such as dimethylaminopropylamine, diethylaminopropylamine, di-n-propylaminopropylamine, dibutylaminopropylamine, dimethylaminoethylamine, diethylaminoethylamine, and N-methylpiperazine, and an imidazole compound such as 2-methylimidazole, 2-ethylimidazole, 2-ethyl-4-methylimidazole, and 2-phenylimidazole. Further examples may include alcohols, phenols, thiols, carboxylic acids, hydrazides, and the like, which have in its molecule a tertiary amino group, such as 2-dimethylaminoethanol, 1-methyl-2-dimethylaminoethanol, 1-phenoxymethyl-2-dimethylaminoethanol, 2-diethylaminoethanol, 1-butoxymethyl-2-dimethylaminoethanol, ethylaminoethanol, 1-(2-hydroxy-3-phenoxypropyl)-2-methylimidazole, 1-(2-hydroxy-3-phenoxypropyl)-2-ethyl-4-methylimidazole, 1-(2-hydroxy-3-butoxypropyl)-2-methylimidazole, 1-(2-hydroxy-3-butoxypropyl)-2-ethyl-4-methylimidazole, 1-(2-hydroxy-3-phenoxypropyl)-2-phenylimidazoline, 1-(2-hydroxy-3-butoxypropyl)-2-methylimidazoline, 2-(dimethylaminomethyl)phenol, 2,4,6-tris(dimethylaminomethyl)phenol, N-β-hydroxyethylmorpholine, 2-dimethylaminoethanethiol, 2-mercaptopyridine, 2-benzoimidazole, 2-mercaptobenzoimidazole, 2-mercaptobenzothiazole, 4-mercaptopyridine, N,N-dimethylaminobenzoic acid, N,N-dimethylglycine, nicotinic acid, isonicotinic acid, picolinic acid, N,N-dimethylglycine hydrazide, N,N-dimethylpropionic acid hydrazide, nicotinic acid hydrazide, and isonicotinic acid hydrazide. However, the above-described compound having in its molecule a tertiary amino group is not limited to these.

Examples of an isocyanate compound used as further another raw material of the solid-dispersed amine adduct latent curing accelerator may include a monofunctional isocyanate compound such as n-butyl isocyanate, isopropyl isocyanate, phenyl isocyanate, and benzyl isocyanate, and a multifunctional isocyanate compound such as hexamethylene diisocyanate, toluylene diisocyanate, 1,5-naphthalene diisocyanate, diphenylmethane-4,4'-diisocyanate, isophorone diisocyanate, xylylene diisocyanate, paraphenylene diisocyanate, 1,3,6-hexamethylene triisocyanate, and bicycloheptane triisocyanate. Furthermore, there can be used a compound containing at its terminal an isocyanate group, which is obtained by the reaction between these multifunctional isocyanate compounds and an active hydrogen compound. Examples of such a compound containing at its terminal an isocyanate group may include an adduct compound having at its terminal an isocyanate group, which is obtained by the reaction between toluylene diisocyanate and trimethylolpropane, and an adduct compound having at its terminal an isocyanate group, which is obtained by the reaction between toluylene diisocyanate and pentaerythritol. However, the above-described compound containing at its terminal an isocyanate group is not limited to these.

Also, examples of the urea compound may include urea and thiourea. However, the above-described urea compound is not limited to these.

The solid-dispersed latent curing accelerator usable in the present invention can be easily manufactured by, for example, as follows. There are mixed (a) two components of the amine compound and the epoxy compound, (b) three components of these two components and the active hydrogen compound, or (c) two components or three components of the amine compound, and the isocyanate compound and/or the urea compound. Then, these mixed components are subjected to a reaction at a temperature from room temperature to 200° C. Thereafter, the obtained reaction product is cooled and solidified, and thereafter ground. Alternatively, the above-described components are subjected to a reaction in a solvent such as methyl ethyl ketone, dioxane, and tetrahydrofuran. Then, the solvent is removed from the reaction product. Thereafter, the solid content is ground.

Representative examples of a commercially available product of the solid-dispersed latent curing accelerator based on an amine-epoxy adduct (based on an amine adduct) may include "Amicure PN-23" (trade name, manufactured by Ajinomoto Fine-Techno Co., Inc.), "Amicure PN-40" (trade name, manufactured by Ajinomoto Fine-Techno Co., Inc.), "Amicure PN-50" (trade name, manufactured by Ajinomoto Fine-Techno Co., Inc.), "Hardener X-3661S" (trade name, manufactured by ACR Co., Ltd.), "Hardener X-3670S" (trade name, manufactured by ACR Co., Ltd.), "Novacure HX-3742" (trade name, manufactured by Asahi Kasei E-materials Corporation), "Novacure HX-3721" (trade name, manufactured by Asahi Kasei E-materials Corporation), and "FXR1121" (trade name, manufactured by T&K TOKA Co., Ltd.). Also, examples of the solid-dispersed latent curing accelerator based on a urea-type adduct may include "Fujicure FXE-1000" (trade name, manufactured by T&K TOKA Co., Ltd.) and "Fujicure FXR-1030" (trade name, manufactured by T&K TOKA Co., Ltd.). However, the above-described commercially available product is not limited to these. One (C) component may be used alone. Also, two or more (C) components may be used in combination.

The radical polymerization inhibitor of the (D) component is a component which is added for increasing stability during the preservation of the resin composition. That is, it is a component which is added for suppressing the proceeding of an unintended radical polymerization reaction. The acrylic resin of the (A) component sometimes generates a radical by itself with a low probability. An unintended radical polymerization reaction sometimes proceeds from the generated radical. The addition of the radical polymerization inhibitor can suppress such proceeding of an unintended radical polymerization reaction of the (A) component.

As the (D) component, any publicly known compound can be used. For example, there can be used at least one selected from the group consisting of N-nitroso-N-phenylhydroxylamine aluminum, triphenylphosphine, p-methoxyphenol, and hydroquinone. Also, there can be used publicly known radical polymerization inhibitors disclosed in JP-A-2010-117545, JP-A-2008-184514, and the like. One (D) component may be used alone. Also, two or more (D) components may be used in combination.

The anionic polymerization retarder of the (E) component is added for providing stability during preservation to the resin composition, thereby to suppress an unintended reaction between an amino group which can be contained in the (C) component, and the (B) component. Imidazole and tertiary amine which can be contained in the (C) component have an amino group. The amino group reacts with the (B) component, thereby to initiate polymerization. The latent curing agent is designed such that the reaction of an amino group is unlikely to proceed at room temperature. However, there still slightly remains a possibility that an amino group reacts with the (B) component at room temperature. The (E) component has a function of suppressing the unintended reaction between an amino group and the (B) component by reacting with the amino group before the amino group reacts with the (B) component.

As the (E) component, any publicly known compound can be used. For example, there can be used as the (E) component at least one compound selected from the group consisting of boric acid ester, aluminum chelate, and organic acid. As boric acid ester, there can be used, for example, the compounds disclosed in JP-A-2011-026539 and Republication of PCT International Publication No. 2005/070991. As aluminum chelate, there can be used, for example, the compound disclosed in Republication of PCT International Publication No. 2005/070991. As organic acid, there can be used, for example, the compound disclosed in Japanese Patent No. 4394281. Examples of a commercially available product of the (E) component may include triisopropyl borate and barbituric acid. One (E) component may be used alone. Also, two or more (E) components may be used in combination.

The value of [thiol equivalent of (B) component]/[acryl equivalent of (A) component] of the resin composition is preferably 0.5 to 2.0. The thiol equivalent of the (B) component is a numerical value (chemical formula (1): 95.7, chemical formula (2): 109.7) obtained by dividing the molecular weight (chemical formula (1): 382.6, chemical formula (2): 438.7) of the (B) component by the number (4) of thiol groups in one molecule. The equivalent of an acrylic resin equals to a value obtained by dividing the molecular weight of the acrylic resin by the number of acryl groups (or methacryl groups) in one molecule. Therefore, when the value of [thiol equivalent of (B) component]/[acryl equivalent of (A) component] is 0.5 to 2.0, it is indicated that [(95.7 for chemical formula (1) or 109.7 for chemical formula (2))/acryl equivalent of (A) component] is 0.5 to 2.0, or that the acryl equivalent of the (A) component is 188 to 250. When the value of [thiol equivalent of (B) component]/[acryl equivalent of (A) component] falls within the range of 0.5 to 2.0, acryl and thiol react with each other in amounts equal to or more than a certain amount thereby to form a firm cured product. Thus, high adhesive strength can be expressed.

The content of the (A) component is preferably 10 to 90 parts by mass with respect to 100 parts by mass of the resin composition, from the viewpoint of the viscosity of the resin composition.

The content of the (C) component is preferably 0.1 to 40 parts by mass with respect to 100 parts by mass of the resin composition, from the viewpoint of the curing speed and pot life of the resin composition.

The content of the (D) component is preferably 0.0001 to 1.0 part by mass with respect to 100 parts by mass of the resin composition. When the content of the (D) component falls within this range, stability during the preservation of the resin composition can be more enhanced, and the pot life of the resin composition can be more extended.

The content of the (E) component is preferably 0.0001 to 1.0 part by mass with respect to 1 part by mass of the (C) component. When the content of the (E) component falls within this range, stability during the preservation of the resin composition can be more enhanced, and the pot life of the resin composition can be more extended.

The resin composition according to the present invention preferably further includes (F) a compound having a glycidyl group, other than the acrylic resin. The (F) component merely reacts with the (B) component by heating. Therefore, the (F) component can enhance stability during the preservation of the resin composition, similarly to the anionic polymerization retarder as the (E) component.

Preferable examples of the (F) component may include a vinyl compound having at least one glycidyl group and polybutadiene having at least one glycidyl group, from the viewpoint of reactivity with the (B) component. An example of a commercially available product of the polybutadiene having at least one glycidyl group may include epoxidized 1,2-polybutadiene manufactured by ADEKA Corporation. One (F) component may be used alone. Also, two or more (F) components may be used in combination.

The content of the (F) component is preferably 1 to 50 parts by mass with respect to 100 parts by mass of the resin composition, from the viewpoint of UV curing properties.

The resin composition preferably further includes a radical polymerization initiator as a (G) component. When the resin composition includes the (G) component, it can be cured by UV irradiation for a short time. The radical polymerization initiator to be used is not particularly limited. As the above-described polymerization initiator, any publicly known material can be used. Specific examples of the radical polymerization initiator may include 1-hydroxycyclohexyl phenyl ketone, 2-hydroxy-2-methyl-1-phenylpropane-1-one, diethoxyacetophenone, 1-(4-isopropylphenyl)-2-hydroxy-2-methylpropane-1-one, 1-(4-dodecylphenyl)-2-hydroxy-2-methylpropane-1-one, 4-(2-hydroxyethoxy)-phenyl(2-hydroxy-2-propyl)ketone, 2-methyl-1-[4-(methylthio)phenyl]-2-morpholinopropane-1, benzoin, benzoin methyl ether, benzoin ethyl ether, benzoin isopropyl ether, benzoin n-butyl ether, benzoin phenyl ether, benzyl dimethyl ketal, benzophenone, benzoylbenzoic acid, methyl benzoylbenzoate, 4-phenyl benzophenone, hydroxybenzophenone, acrylic benzophenone, 4-benzoyl-4'-methyldiphenyl sulfide, 3,3'-dimethyl-4-methoxybenzophenone, thioxanthone, 2-chlorothioxanthone, 2-methylthioxanthone, 2,4-dimethylthioxanthone, isopropylthioxanthone, 2,4-dichlorothioxanthone, 2,4-diethylthioxanthone, 2,4-diisopropylthioxanthone, 2,4,6-trimethylbenzoyldiphenylphosphine oxide, methyl phenylglyoxylate, benzyl, and camphorquinone. One (G) component may be used alone. Also, two or more (G) components may be used in combination.

The resin composition may further include, as necessary, additives such as an epoxy resin, carbon black, titanium black, a silica filler, an alumina filler, a silane coupling agent, an ion trapping agent, a leveling agent, an antioxidant, an antifoaming agent, and a thixotropic agent, as long as the object of the present invention is not impaired. Also, the resin composition may include a viscosity modifier, a flame retardant, a solvent, or the like. Here, carbon black and titanium black can be used as a material for providing light shielding properties. From the viewpoint of balancing light shielding properties and UV curing properties (curing depth), titanium black is preferably used. Examples of titanium black may include titanium black 12S (manufactured by Mitsubishi Materials Electronic Chemicals Co., Ltd.), titanium black 13M (manufactured by Mitsubishi Materials Corporation), titanium black 13M-C (manufactured by Mitsubishi Materials Corporation), and Tilack D (manufactured by Ako Kasei Co., Ltd.). Particularly preferable titanium black is titanium black 13M.

The resin composition can be obtained by, for example, simultaneously or separately stirring, melting, mixing and dispersing the (A) to (E) components, additives, and the like, while performing a heat treatment as necessary. The apparatuses for these mixing, stirring, dispersing, and the like are not particularly limited. There can be used an automated mortar, a Henschel mixer, a three-roll mill, a ball mill, a planetary mixer, a bead mill, and the like which are equipped with a stirrer and a heater. Also, an appropriate combination of these apparatuses may be used.

The resin composition obtained in this manner is photocurable and thermosetting. When the resin composition is used for an image sensor module, it is thermally cured at preferably 70 to 80° C.

The resin composition according to the present invention can be used as an adhesive agent for bonding components with each other, or as a raw material of the adhesive agent. Also, this resin composition can be used as a sealing agent for electronic components, or as a raw material of the sealing agent.

EXAMPLES

Hereinafter, the present invention will be described by examples. However, the present invention is not limited to these examples. It is noted that in the following examples, "parts" and "%" indicate parts by mass and % by mass respectively, unless otherwise stated.

Examples 1 to 12 and Comparative Examples 1 to 6

Resin compositions were prepared according to the formulations indicated in Tables 1 and 2, using a three-roll mill.

<Viscosity and Thickening Rate>

The initial viscosity of the resin composition within one hour after it had been prepared was measured as described below. That is, the value of the viscosity was measured using an E-type viscometer (rotor type: 3°×R9.7) at 10 rpm. After the measurement of the initial viscosity, the resin composition was left to stand at 25° C. and 50% RH for 24 hours. The viscosity of the resultant resin composition was measured again. Then, the thickening rate was calculated. Here, the viscosity increase rate was calculated according to the following formula:

thickening rate=[(viscosity after 24 hours)−(initial viscosity)]/(initial viscosity)×100.

The viscosity is preferably 0.1 to 100 Pa. The thickening rate is preferably 1.0 to 1.2. The measurement results are indicated in Table 1 to Table 2.

<Adhesive Strength>

The resin composition was printed through a stencil on a glass plate to have a diameter of 2 mm and a thickness of 125 μm. An alumina chip having a size of 3.2 mm×1.6 mm×0.45 mm in thickness was mounted on the printed resin composition. Then, a load was applied on the obtained product. Thereafter, the resin composition was cured to prepare a test piece (n=10). The curing condition at this time was as follows. In the case of "only UV," UV at 2000 mJ/cm$^2$ (UV wavelength: 365 nm, LED lamp) was applied onto the surface (back surface) opposite the surface (front surface) on which the alumina chip was mounted. In the case of "only heat," the resin composition was cured in a blast oven at 80° C./60 minutes. In the case of "UV+heat," UV at 2000 mJ/cm$^2$ (UV wavelength: 365 nm, LED lamp) was applied onto the surface (back surface) opposite the surface (front surface) on which the alumina chip was mounted, and thereafter, the resin composition was cured in a blast oven at 80° C./60 minutes. The side surface of the alumina chip on the glass plate was pushed by a strength tester (MODEL-1605HTP manufactured by Aikoh Engineering Co., Ltd.). Then, the shear strength was calculated from a numerical value obtained when the alumina chip was peeled off. The shear strength is preferably 3 Kgf/chip or more, and further preferably 5 Kgf/chip or more. The measurement results (unit: Kgf/chip) are indicated in Table 1 and Table 2. Next, in Examples 1 to 12 and Comparative Examples 2, 4, and 6, the test piece having been cured with "UV+heat" was subjected to a pressure cooker test (hereinafter, PCT) (2 atm, 121° C., 100% RH, one hour). Thereafter, the shear strength was calculated in a similar manner. The results (unit: Kgf/chip) are indicated in Table 1 and Table 2.

TABLE 1

| | Raw materials | Example 1 | Example 2 | Example 3 | Example 4 | Example 5 | Example 6 | Example 7 | Example 8 | Example 9 |
|---|---|---|---|---|---|---|---|---|---|---|
| (A) Component | Acrylic resin 1[1)] | 76.7 | 67.1 | 59.5 | 53.2 | 56.5 | 56.5 | 63.5 | 65.5 | 0 |
| | Acrylic resin 2[2)] | 0 | 0 | 0 | 0 | 0 | 0 | 0 | 0 | 61.9 |
| (B) Component | Compound represented by chemical formula (1)[3)] | 14.4 | 25.2 | 33.6 | 40.7 | 21.2 | 21.2 | 23.9 | 24.6 | 31.0 |
| | Compound represented by chemical formula (1)[4)] | 0 | 0 | 0 | 0 | 0 | 0 | 0 | 0 | 0 |
| (B') Component | Thiol compound[5)] | 0 | 0 | 0 | 0 | 0 | 0 | 0 | 0 | 0 |
| (C) Component | Latent curing agent 1[6)] | 7.7 | 6.7 | 6.0 | 5.3 | 7.1 | 7.1 | 6.3 | 6.6 | 6.2 |
| | Latent curing agent 2[7)] | 0 | 0 | 0 | 0 | 0 | 0 | 0 | 0 | 0 |
| (D) Component | Radical polymerization inhibitor 1[8)] | 0.0001 | 0.0001 | 0.0001 | 0.0001 | 0.0001 | 0.0001 | 0.0001 | 0.0001 | 0.0001 |
| | Radical polymerization inhibitor 2[9)] | 0 | 0 | 0 | 0 | 0 | 0 | 0 | 0 | 0 |
| (E) Component | Isopropyl borate[10)] | 1.2 | 1.0 | 0.9 | 0.8 | 1.1 | 1.1 | 0 | 0 | 0.9 |
| | Aluminum chelate[11)] | 0 | 0 | 0 | 0 | 0 | 0 | 6.3 | 0 | 0 |
| | Barbituric acid[12)] | 0 | 0 | 0 | 0 | 0 | 0 | 0 | 3.3 | 0 |
| (F) Component | Polybutadiene with glycidyl group[13)] | 0 | 0 | 0 | 0 | 14.1 | 0 | 0 | 0 | 0 |
| | Vinyl compound with glycidyl group[14)] | 0 | 0 | 0 | 0 | 0 | 14.1 | 0 | 0 | 0 |
| | Total | 100.0 | 100.0 | 100.0 | 100.0 | 100.0 | 100.0 | 100.0 | 100.0 | 100.0 |
| | Thiol equivalent of (B) component/acryl equivalent of (A) component | 0.5 | 1.0 | 1.5 | 2.0 | 1.0 | 1.0 | 1.0 | 1.0 | 1.0 |
| Evaluation results | Initial viscosity (unit: Pa · s) | 4.2 | 6.7 | 10.8 | 12.3 | 12.5 | 10.1 | 8.0 | 7.0 | 36.0 |
| | Viscosity after 24 hours (unit: Pa · s) | 4.3 | 6.8 | 11.0 | 12.5 | 12.6 | 10.3 | 8.1 | 7.2 | 36.9 |
| | Thickening rate | 1.0 | 1.0 | 1.0 | 1.0 | 1.0 | 1.0 | 1.0 | 1.0 | 1.0 |
| | Adhesive strength (only UV) | 3.2 | 3.7 | 3.6 | 3.2 | 3.5 | 3.7 | 3.8 | 3.6 | 3.5 |
| | Adhesive strength (only heat) | 10.9 | 13.7 | 12.4 | 10.1 | 12.1 | 12.1 | 14.1 | 13.9 | 14.0 |
| | Adhesive strength (UV + heat) | 12.1 | 15.2 | 14.9 | 12.2 | 16.2 | 15.8 | 16.1 | 15.8 | 15.8 |

TABLE 1-continued

| Raw materials | Example 1 | Example 2 | Example 3 | Example 4 | Example 5 | Example 6 | Example 7 | Example 8 | Example 9 |
|---|---|---|---|---|---|---|---|---|---|
| Adhesive strength (1 hour after PCT) | 5.1 | 6.9 | 7.3 | 6.2 | 7.5 | 7.8 | 7.7 | 8.0 | 7.2 |

TABLE 2

| | Raw materials | Example 10 | Example 11 | Example 12 | Comparative Example 1 | Comparative Example 2 | Comparative Example 3 | Comparative Example 4 | Comparative Example 5 | Comparative Example 6 |
|---|---|---|---|---|---|---|---|---|---|---|
| (A) Component | Acrylic resin 1[1] | 64.6 | 67.1 | 67.0 | 67.7 | 67.1 | 71.9 | 89.7 | 0 | 62.1 |
| | Acrylic resin 2[2] | 0 | 0 | 0 | 0 | 0 | 0 | 0 | 0 | 0 |
| (B) Component | Compound represented by chemical formula (1)[3] | 0 | 25.2 | 25.2 | 25.5 | 25.2 | 27.0 | 0 | 76.5 | 0 |
| | Compound represented by chemical formula (1)[4] | 27.9 | 0 | 0 | 0 | 0 | 0 | 0 | 0 | 0 |
| (B') Component | Thiol compound[5] | 0 | 0 | 0 | 0 | 0 | 0 | 0 | 0 | 31.1 |
| (C) Component | Latent curing agent 1[6] | 6.5 | 0 | 6.7 | 6.8 | 6.7 | 0 | 9.0 | 20.4 | 6.2 |
| | Latent curing agent 2[7] | 0 | 6.7 | 0 | 0 | 0 | 0 | 0 | 0 | 0 |
| (D) Component | Radical polymerization inhibitor 1[8] | 0.0001 | 0.0001 | 0 | 0.0001 | 0 | 0.0001 | 0.0001 | 0.0002 | 0.0001 |
| | Radical polymerization inhibitor 2[9] | 0 | 0 | 0.1 | 0 | 0 | 0 | 0 | 0 | 0 |
| (E) Component | Isopropyl borate[10] | 1.0 | 1.0 | 1.0 | 0 | 1.0 | 1.1 | 1.3 | 3.1 | 0.6 |
| | Aluminum chelate[11] | 0 | 0 | 0 | 0 | 0 | 0 | 0 | 0 | 0 |
| | Barbituric acid[12] | 0 | 0 | 0 | 0 | 0 | 0 | 0 | 0 | 0 |
| (F) Component | Polybutadiene with glycidyl group[13] | 0 | 0 | 0 | 0 | 0 | 0 | 0 | 0 | 0 |
| | Vinyl compound with glycidyl group[14] | 0 | 0 | 0 | 0 | 0 | 0 | 0 | 0 | 0 |
| | Total | 100.0 | 100.0 | 100.0 | 100.0 | 100.0 | 100.0 | 100.0 | 100.0 | 100.0 |
| | Thiol equivalent of (B) component/acryl equivalent of (A) component | 1.0 | 1.0 | 1.0 | 1.0 | 1.0 | 1.0 | — | — | 1.0 |
| Evaluation results | Initial viscosity (unit: Pa·s) | 25.0 | 6.6 | 6.7 | Gelation during preparation | 6.7 | 3.8 | 0.4 | — | 0.5 |
| | Viscosity after 24 hours (unit: Pa·s) | 25.5 | 6.8 | 6.9 | — | 8.9 | 3.8 | 0.4 | — | 0.5 |
| | Thickening rate | 1.0 | 1.0 | 1.0 | — | 1.3 | 1.0 | 1.0 | — | 1.0 |
| | Adhesive strength (only UV) | 3.6 | 3.5 | 3.7 | — | 3.5 | 1.8 | Not cured | Not cured | 1.8 |
| | Adhesive strength (only heat) | 14.3 | 14.1 | 14.2 | — | 13.9 | Not cured | Not cured | Not cured | 13.5 |
| | Adhesive strength (UV + heat) | 16.2 | 15.5 | 15.9 | — | 15.4 | — | 4.4 | — | 15.0 |
| | Adhesive strength (1 hour after PCT) | 7.5 | 8.1 | 8.2 | — | 7.2 | — | 0.0 | — | 0.1 |

As understood from Tables 1 and 2, the thickening rate was within an appropriate range in all of Examples 1 to 12. Furthermore, the adhesive strength measured in each condition was high. On the contrary, gelation occurred during the preparation of the resin composition in Comparative Example 1 which does not include the (E) component. In Comparative Example 2 which does not include the (D) component, the thickening rate was poor. In Comparative Example 3 which does not include the (C) component, the resin composition was not cured with only heat. In Comparative Example 4 which does not include the (B) component, the resin composition was not cured with only UV or with only heat. Furthermore, the adhesive strength after PCT significantly decreased. In Comparative Example 5 which does not include the (A) component, the resin composition was not cured with only UV or with only heat. In Comparative Example 6 which was prepared with a thiol compound instead of the (B) component, the adhesive strength after PCT significantly decreased.

INDUSTRIAL APPLICABILITY

According to the present invention, there is provided a photocurable and thermosetting resin composition which suppresses decrease of adhesive strength in a moisture resistance test of the cured resin composition, and has a sufficiently long pot life. This resin composition is particularly useful as an adhesive agent and a sealing agent.

The invention claimed is:

1. A resin composition, comprising:
   (A) an acrylic resin;
   (B) a multifunctional nitrogen-containing heterocyclic compound represented by chemical formula (1) or chemical formula (2)

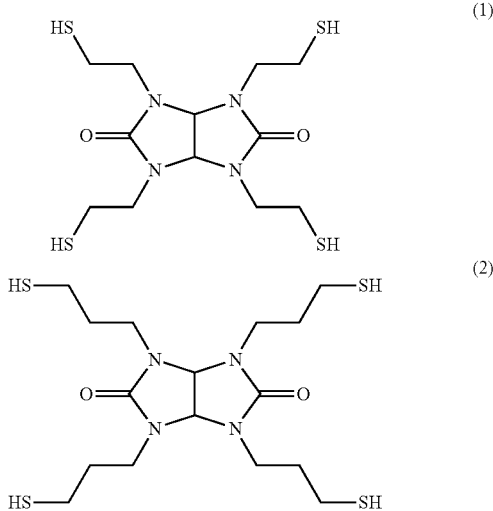

(C) a latent curing agent;
   (D) a radical polymerization inhibitor; and
   (E) an anionic polymerization retarder.

2. The resin composition according to claim 1, further comprising:
   (F) a compound having a glycidyl group, other than the acrylic resin.

3. The resin composition according to claim 2, wherein the (F) component is a vinyl compound having at least one glycidyl group.

4. The resin composition according to claim 2, wherein the (F) component is polybutadiene having at least one glycidyl group.

5. The resin composition according to claim 1, wherein [thiol equivalent of (B) component]/[acryl equivalent of (A) component] is 0.5 to 2.0.

6. The resin composition according to claim 1, wherein the content of the (D) component is 0.0001 to 1.0 part by mass with respect to 100 parts by mass of the resin composition.

7. The resin composition according to claim 1, wherein the content of the (E) component is 0.001 to 1.0 part by mass with respect to 1 part by mass of the (C) component.

8. The resin composition according to claim 1, wherein the (D) component is at least one selected from the group consisting of N-nitroso-N-phenylhydroxylamine aluminum, triphenylphosphine, p-methoxyphenol, and hydroquinone.

9. The resin composition according to claim 1, wherein the (E) component is at least one selected from the group consisting of boric acid ester, aluminum chelate, and organic acid.

10. An adhesive agent comprising the resin composition according to claim 1.

11. A sealing agent comprising the resin composition according to claim 1.

12. The resin composition according to claim 2, wherein [thiol equivalent of (B) component]/[acryl equivalent of (A) component] is 0.5 to 2.0.

13. The resin composition according to claim 2, wherein the content of the (D) component is 0.0001 to 1.0 part by mass with respect to 100 parts by mass of the resin composition.

14. The resin composition according to claim 2, wherein the content of the (E) component is 0.001 to 1.0 part by mass with respect to 1 part by mass of the (C) component.

15. The resin composition according to claim 2, wherein the (D) component is at least one selected from the group consisting of N-nitroso-N-phenylhydroxylamine aluminum, triphenylphosphine, p-methoxyphenol, and hydroquinone.

16. The resin composition according to claim 2, wherein the (E) component is at least one selected from the group consisting of boric acid ester, aluminum chelate, and organic acid.

17. An adhesive agent comprising the resin composition according to claim 2.

18. A sealing agent comprising the resin composition according to claim 2.

* * * * *